United States Patent [19]

Ishibashi

[11] Patent Number: 5,140,126

[45] Date of Patent: Aug. 18, 1992

[54] RESISTANCE WELDING METHOD AND RESISTANCE WELDING DEVICE FOR LEAD ACID BATTERY

[75] Inventor: Tatsuya Ishibashi, Tochigi, Japan

[73] Assignee: Furukawa Denchi Kabushiki Kaisha, Yokohama, Japan

[21] Appl. No.: 576,470

[22] PCT Filed: Mar. 8, 1989

[86] PCT No.: PCT/JP89/00246

§ 371 Date: Sep. 6, 1990

§ 102(e) Date: Sep. 6, 1960

[87] PCT Pub. No.: WO89/08931

PCT Pub. Date: Sep. 21, 1989

[30] Foreign Application Priority Data

Mar. 10, 1988 [JP] Japan ................... 63-57013

[51] Int. Cl.$^5$ ............................................. B23K 11/24
[52] U.S. Cl. .................. 219/110; 219/117.1
[58] Field of Search .......... 219/110, 108, 117.1, 219/118

[56] References Cited

U.S. PATENT DOCUMENTS 3,947,290  3/1976  Matter et al. ............... 219/118
4,301,351  11/1981  Mathews ...................... 219/110
4,672,167  6/1987  Preg et al. ................... 219/110
4,734,556  3/1988  Namiki ......................... 219/110

Primary Examiner—Clifford C. Shaw
Attorney, Agent, or Firm—Armstrong & Kubovcik

[57] ABSTRACT

A resistance welding method wherein a resistance welding between cells of others used in the manufacturing of a lead acid battery, is carried out by means of a constant power control system. There are provided a method and a circuit device (A) therefore to carry out at intervals of a predetermined cycle that a resistance value between the members (e), (e) to be welded is, while applied with a current, measured by a resistance measuring device (11). The measured value is then inputted to a constant power controller (13), and a current having a current value corresponding thereto is supplied to both the members (e), (e) for current application for welding, thereby performing a stable and good weld. In addition, an up slope controller (15) is incorporated in the weld resistance circuit device (A) so that the resistance welding is performed through a current application which is increased gradually from a small welding current amount for application to both the members (e), (e), thereby preventing the occurrence of sparks during the resistance welding.

5 Claims, 4 Drawing Sheets

RESISTANCE WELDING METHOD AND RESISTANCE WELDING DEVICE FOR LEAD ACID BATTERY

TECHNICAL FIELD

The present invention relates to a resistance welding method and a resistance welding circuit for a lead acid battery.

BACKGROUND ART

A conventional method for resistance welding between the cells of in a lead acid battery carries out the welding by means of a constant current control system or a constant voltage control system. More specifically, it has been general that lugs of mutually opposite polarities projecting upwards from the respective ends of straps connecting respective groups of tabs of cell assemblies incorporated in the respective cell chambers of a lead acid battery are so positioned as to face each other through a hole made in a partition wall partioning the adjacent cell chambers, and a pair of resistance welding guns, i.e., electrodes of a resistance welding machine are applied to the outer surfaces of the lugs of both the straps and are pressed to cause both lugs to become attached under pressure to both the surfaces of the partition wall and further cause the central portions of both the lugs to become dented and thrust into the hole by the projections of the guns, and in this condition, a current is applied thereto through the guns by the constant current control system or the constant voltage control system for performing a resistance welding between both the lugs, i.e., the so-called cell-to-cell resistance welding.

The foregoing welding method of the conventional constant current control system or the constant voltage control system is subjected to the following problems, however. Namely, a contact area in the central portion of each of the two lugs in which they make contact with each other under pressure is not consistent due to differences in hardness of the lugs of the straps, changes in the positions of the projections when the outer surfaces of the mutually facing lugs are pressed with the pair of guns (electrodes) having the projections, differences in thickness of the partition walls, variable diameters of the holes, etc. Therefore, a quantity of heat generated with the current application thereto by the conventional constant current control system or constant voltage control system is not unvarying as clearly indicated in the following. Namely, in the case of the constant current control system, the current I is kept constant, so that when the contact area in which the two electrodes have contact with each other is comparatively small, an electric resistance value R becomes large, thus resulting in a larger quantity of heat $Q=kI_2RT$. Inversely, if the contact area is comparatively large, the electric resistance value R becomes small, and accordingly the quantity of heat becomes small.

On the other hand, in the constant voltage control system an electric voltage $V=IR$ is constant, so that if the contact area between the two lugs is comparatively small, the resistance value becomes large, and accordingly the current becomes so much smaller, and as a result, the quantity of heat $Q=kI\cdot IRT$ becomes small. Inversely, if the constant area between the two lugs is large, the resistance value R becomes small, and accordingly the electric current value I becomes large, and as a result, the quantity of heat becomes large.

Thus, the contact area formed when the two lugs are pressed for their contact with each other by the welding guns is varied due to the foregoing various reasons and the generated quantity of heat fluctuates accordingly, so that it is not possible to obtain a stable welding through the constant current control system or the constant voltage control system and, in some occasions, an imperfect welding is more liable to result therefrom. In addition, with the constant current control system or the stop voltage control system, there are involved the following problems when examined as to the course of the current application to the lugs during the resistance welding. Namely, in the constant current control system, if the mutual contact area is small at the beginning of current application for welding, sparks are liable to occur and in the course of welding by the applied current, the contact area becomes larger, but it is such that when there is developed a large void, the current is kept constant notwithstanding, that is, the current is not lowered and thus there fly up sparks, at which time molten lead is scattered and attached to the portion between a negative plate and a positive plate of the cell assembly. This is liable to cause short-circuits while resulting in a defective weld. As for the constant voltage control system, if the contact area is small, sparks occur at the beginning of the current application for welding, and in the course of welding the contact area becomes larger to increase the current accordingly, and when the voids are formed, sparks are generated to cause scattering of the molten lead which in turn is liable to cause the short-circuits in a similar fashion as mentioned above while incurring a defective weld.

DISCLOSURE OF THE INVENTION

The present invention is to provide a resistance welding method for a lead acid battery which has solved the foregoing problems observed with the conventional resistance welding methods. In a resistance welding method for a lead acid battery in which members to be welded to each other are applied with an electric current under such a condition that their mutually facing surfaces are kept in pressure contact with each other so that their mutual contact surfaces may be resistance-welded, the present invention is characterized in that the current is applied to both the members so that they may be welded together by means of a constant power control system.

In the constant power control system in the resistance welding method according to the present invention, it is characterized in that it is all carried out at intervals of a predetermined cycle that a resistance value between both the members while applied with current is measured, the measured value is then inputted into a constant power controller, and an electric current of a current value determined in the controller on the basis of the measured value is applied to both the members.

Another aspect of the present invention is to provide a resistance welding method for a lead acid battery which has solved the problem of sparks occurring with the foregoing conventional resistance welding method at the beginning of current application for resistance welding, thereby assuring an excellent welding, and which is characterized by an up slope control carried out, prior to operating the foregoing constant power control system, for gradually increasing the amount of a current being applied over a few cycles starting from the outset of the current application to both the members.

Further, the present invention is to provide a resistance welding circuit device for carrying out the aforementioned resistance welding method of the present invention of for a lead acid battery, said welding circuit device being characterized in that it comprises a pair of resistance welding guns for pressing to each other members to be welded together so as to put their mutually facing surfaces in pressure contact with each other and applying a current thereto under this condition, a resistance measuring device for measuring an electric resistance value between the members to be welding while in the pressure contact condition, and a constant power controller connected to the resistance measuring device, so that a control current set by the constant power controller is applied to both the members to be welded through the resistance welding guns of a welding machine.

Furthermore, the present invention is to provide a device for preventing the sparks that can occur at the beginning of the current application and assuring a very excellent welding as the resistance welding method according to the present invention is implemented with use thereof, said device being an up slope controller controlling the current application in such a manner as to gradually increase the amount of current supply to both the members to be welded together, over a period from the start of the current application up to a few cycles of current thereafter. This up slope controller is incorporated in the constant power controller which is comprised in the above-mentioned welding circuit device according to the present invention.

As stated in the foregoing, the present invention is such that the resistance welding between the members to be welded is carried out by the constant power control system, wherein the electric welding is performed with the electric power supply kept at a constant level regardless of the size of the contact area and/or changes in the resistance value between both the members so that good and stable welding can be achieved. In the course of the welding, a resistance value between both the members is measured at intervals of a predetermined cycle of current such as a half cycle, and on the basis of the measured value, the current application so adjusted through the constant power controller so as to have a current value corresponding thereto in terms of making a constant power is carried out. In this case, when the current application is carried out under the up slope control for gradually increasing a power value over a few cycles from the beginning of the resistance welding, the occurrence of the spark can be prevented.

THE BEST MODE FOR CARRYING OUT THE INVENTION

Figure 1:
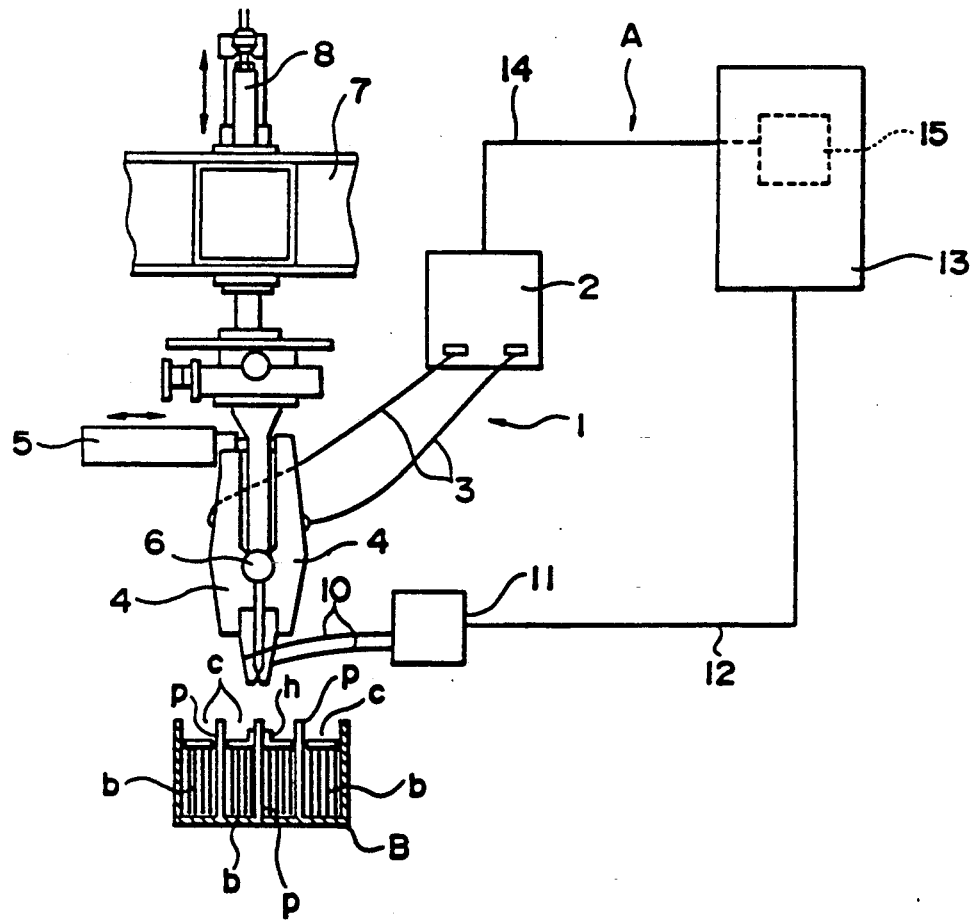
FIG. 1 is a general view of one embodying example of a device for carrying out the method of the present invention.

One embodying example of the present invention will now be explained with reference to the accompanying drawings:

FIG. 1 shows a resistance welding circuit device in one embodying example for carrying out a resistance welding method according to the present invention. In the drawings, 1 denotes a welding machine comprising a welding transformer 2 and a pair of clamp-type resistance welding guns 4,4 connected to leads 3,3 coming from the welding transformer 2. The pair of welding guns 4,4 which are linked to a pressure cylinder 5 provided on the side thereof, are operated to open and close freely about a pivot 6 as the pressure cylinder expands and contracts.

Further, the welding guns 4,4 are so arranged as to be moved upwards and downwards by an elevated cylinder 8 attached vertically to an attaching beam 7 supported at both ends thereof by supports. According to the present invention, welding resistance measuring terminals 9,9 are provided on the side surfaces of the welding guns 4,4 and connected to a resistance measuring device 11 through connection cords 10,10. In addition, an output side of the resistance measuring device 11 is connected to a constant power controller 13 through a connecting line 12, and an output side of the constant power controller 13 is connected to the foregoing welding transformer 2 through a connecting line 14.

Figure 2:
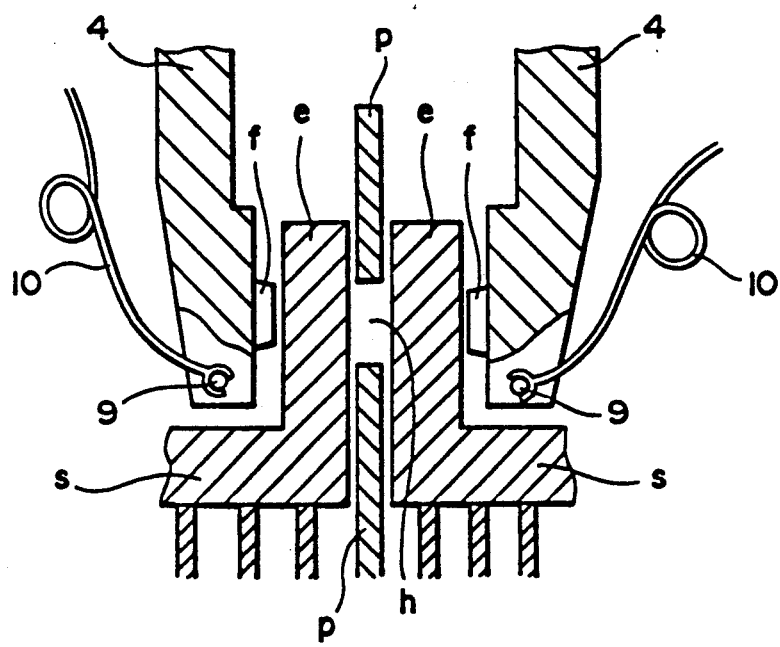
FIGS. 2 to 4 are sectional side views of weld portions showing welding steps of one embodying example to carry out the method of the present invention.
Figure 3:
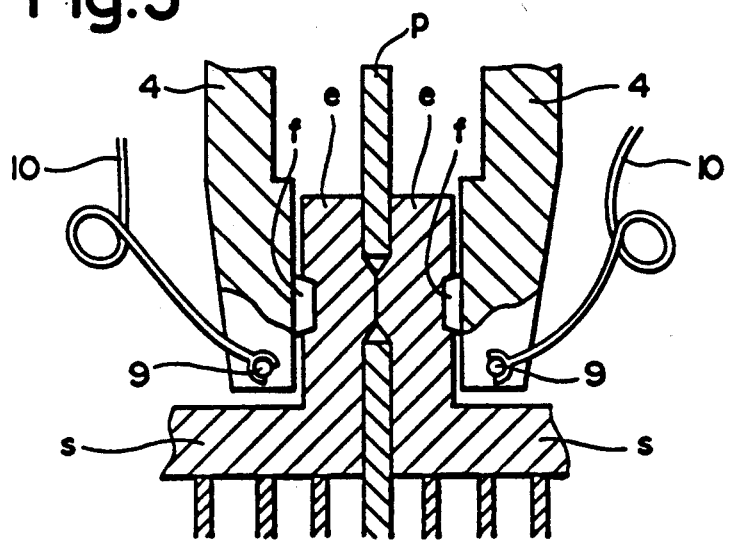
Figure 4:
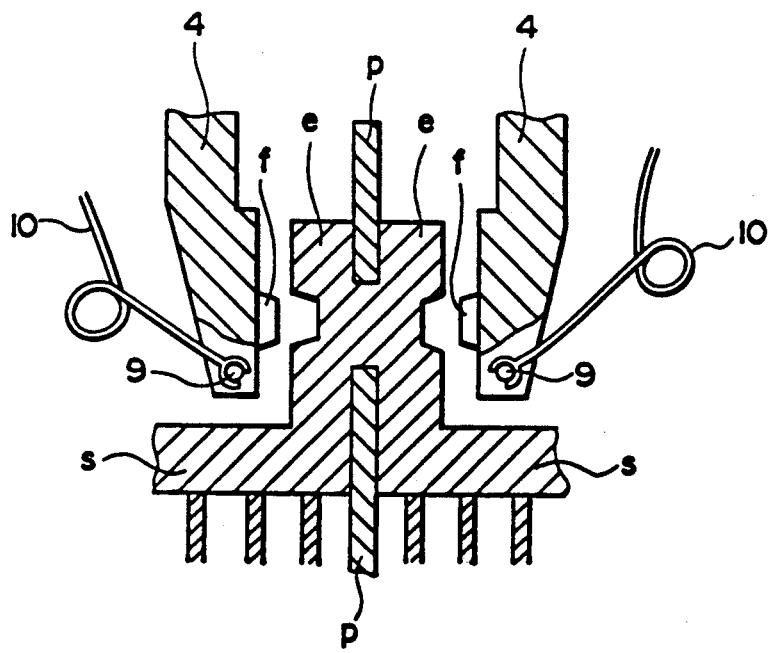
Figure 5:
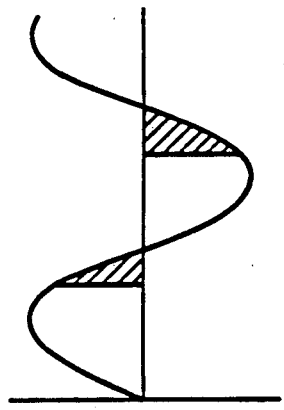
FIG. 5 is a graph of a current waveform in a constant voltage control.

The operation of the resistance welding circuit device 4 of the present invention arranged as above will now be explained as follows:

When plate-like members e,e to be welded together (plate-like lugs for cell-to-cell connection), each of which is projected upwards respectively from one end of one of straps S,S of mutually opposite polarities and located on one or the other side of a partition wall P partitioning cells b,b, ... in cell chambers c,c, ... in a lead acid battery B placed below the pair of resistance welding guns 4,4 are to be resistance-welded together through a hole h made in the partition wall P thereof, the resistance welding guns 4,4 are moved downward to begin with, and as shown in FIG. 2, are brought closer to outer surfaces of the plate-like lugs e,e which are disposed in a face-to-face relation, in such a manner that the welding guns may be disposed to have projections f,f projecting from the inenr sides thereof positioned in alignment with the hole h. From this condition, the pressure cylinder 5 is actuated to operate the pair of guns 4,4 so that the mutually facing plate-like lugs e,e at the inside thereof are clamped and pressed from outside so as to have the inner surfaces of the plate-like lugs e,e attached liquid-tightly to the circumferential surfaces of the hole h of the partition wall P while the central portions of the inner surfaces of the plate-like lugs e,e are made to thrust into the hole h and their mutually opposite central surfaces made to abut with each other under pressure (FIG. 3). In this condition, an a. c. current from the welding transformer 2 connected to a power source is applied to the lugs e,e held in a pressure-contact condition through the pair of resistance welding guns 4,4 to start the resistance welding. Since the pair of resistance welding guns 4,4 are already provided with the welding resistance measuring terminals 9,9, a resistance value at the pressure contact surfaces of the plate-like lugs e,e is measured through these terminals during this current application by the welding resistance measuring device 11, and a signal of the measured resistance value R is inputted into the constant power controller 13. Thus, in the constant power controller 13, a signal of a current value I determined from a preset power value W and also on the basis of the measured resistance value R as corresponding to the measured resistance value R is outputted and transmitted to the welding transformer 2. A current corresponding to the current value I is applied to the plate-like lugs e,e through the resistance welding 4,4. In this case, the measurement of the resistance value and the constant power control consequential therefrom may be carried out at intervals of a predetermined cycle such as a half cycle or one cycle of current, etc. In the case of the half-cycle control, the resistance value R is measured at a first one-half cycle of a.c. power supply and, at the next or second half cycle, the current having a current value I set by the constant power controller 13 in response to the measured resistance value is applied to the plate-like lugs e,e. In a like manner, during this next half-cycle, a resistance value at the pressure contact surfaces between the plate-like lugs e,e now applied with the newly set current is remeasured. In another subsequent half-cycle, setting a current value I corresponding to the remeasured resistance value and applying a current having that current value are carried out. This repetitive operation is repeated for cycles thereof, for instance, so as to perform the welding with a consistently constant power, and the welding between the plate-like lugs e,e is carried out to a good finish. Immediately after completion of the welding, the resistance welding guns 4,4 are moved away from both the lugs e,e as shown in FIG. 4. As is clear from FIG. 4, both the members e,e to be welded are fused together at their mutual pressure-contact surfaces to obtain a strong weld. To describe it more in detail, the constant power control system of the present invention is such that, in the case of the half-cycle control of the foregoing embodying example, a current determined as constituting $$I = \sqrt{\frac{R}{W}}$$

in relation to W(constant)=I$^2$R is set on the basis of a resistance R measured at each half cycle and, using this current, a current control for phase control of the next half cycle (namely, a control of weld time), which may be for instance as indicated by a hatched section in each half cycle shown in FIG. 5, is carried out, all through the constant power controller 13. For instance, when the constant power controller 13 is so set as to yield a constant power of 2 kw and current of 5,000 A is applied at a first half cycle at the beginning of current application, a resistance value between the plate-like lugs e,e is measured, and the measured value R, say, $0.78 \times 10^{-4}$ Ω is inputted into the constant power controller 13, and a current of about 5,060 A derived on the basis of said resistance value is applied to the plate-like lugs e,e at the next half cycle by the controller 13. A resistance value R is again measured during that next half cycle and a current amount I for another next half cycle is thus set on the basis thereof and applied to the plate-like lugs e,e. In this way, 10 cycles in total of such current application under the constant power control system are performed to complete the resistance welding between the plate-like lugs, e,e. According to the present invention, the constant power control system is of the type that the resistance between the members e,e to be welded together is measured at preset intervals, such as every half cycle, as from the start of the current application and, based on this, a current amount for application to the members e,e to be welded together is set in accordance with a predetermined constant power value and is then applied to them. Therefore, the resistance decreases with increase in the number of the current application cycles and, in commensuration therewith, the current amount is increased, so that even when the resistance would increase in the final stage should voids be formed then, the current application amount is decreased to do away with any defective weld that could result from electric sparks that take place with a conventional constant current welding system or the like in which the current application amount is not decreased even when the voids are formed. Thus, it can carry out the welding stably and satisfactorily.

In the conventional current or constant voltage control system, sparks are liable to occur at the beginning of current application and more so especially when the diameter of a circular contact surface formed initially by the lugs e,e as they make contact with each other through the circular hole h in the partition wall P of the battery container is about 2 mm or less, thus resulting in a very high fraction defective with respect to the final welded condition.

Figure 6:
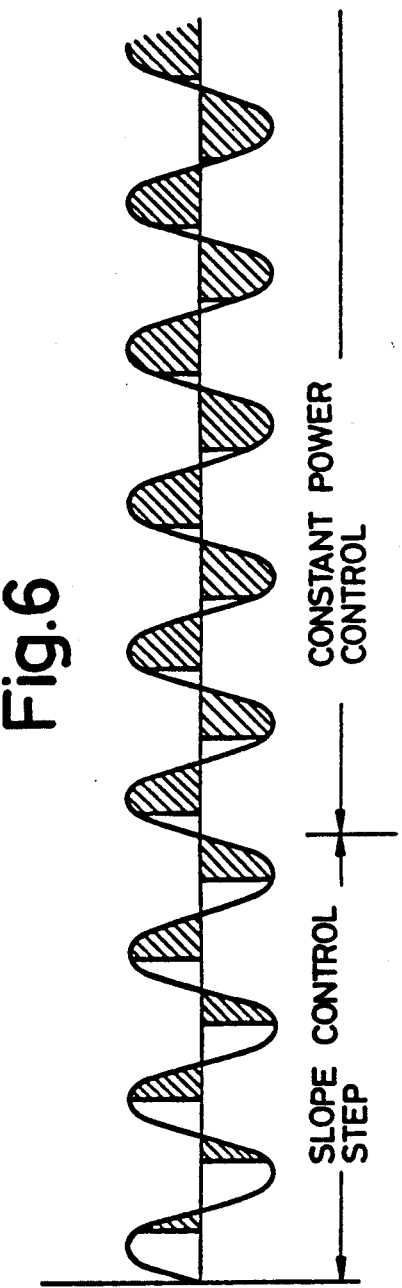
FIG. 6 is a current application graph showing a mode of change of a welding current in one embodying example of a constant power control system where an up slope control is applied at the beginning of the welding current application.

It has been confirmed that, when the resistance welding is carried out by the constant power control system according to the present invention, the resistance welding is performed by applying a comparatively small current at the beginning of the current application and, in succession thereto, the welding through the constant power control system is carried out so that, even if the diameter of the hole h of the partition wall P is 1-2 mm as mentioned above, the welding is performed without generation of sparks and there is obtained a weld finish completely free of any defective welded part in the welded zone. Then, on top of that, according to the present invention, it is to provide a resistance welding method which is characterized in that prior to working the constant power control system, a current under an up slope control is applied to the members e,e to be welded. Therefore, it is further characterized by use of an up slope controller 15 incorporated in the resistance welding circuit device A for carrying out the method. It is general that, as shown in the figure, the up slope controller 15 is incorporated in the constant power controller 13 of the circuit device A. As for the constant power controller 13 and the up slope controller 15 themselves and means for incorporating them, these may be made available from relevant known art. From the up slope controller 15 is outputted a stepwise increased current signal and, in accordance with that signal, current of the welding transformer 2 is determined. This is achieved by using a thyristor or the like and controlling a conducting time of the thyristor. For instance, when such an automatically stepwise increased current application to the kyoku plate-like lugs e,e is carried out by the up slope controller 15 through the pair of guns 4,4 from the welding transformer 2 in such a manner that a comparatively small current of 1,500 A is applied in the first one cycle that is the starting cycle of the current application, 3,000 A is applied in the next or second one, and a current of 4,500 A is applied in another next or third one, there is no occurrence of the sparks, and the resistance welding progresses gradually. Therefore, from the fourth cycle on, the current application is changed over to that of 5,000 A of the foregoing constant power control (2kw) and said constant power control goes on until the 10th cycle to complete the welding operation. In this case, the power under the up slope control is so arranged as to be increased stepwise; 0.5 kw for the first cycle, 1 kw for the second cycle, and 1.5 kw for the third cycle. FIG. 6 shows a stepwise increase mode of the current application when the foregoing up slope control and constant power control are carried out in succession. With the up slope control applied in advance, the welding between the lugs e,e is carried out without sparking in the initial stage of current application even if the diameter of the initial mutual contact area is 2 mm or less as mentioned earlier, and the resultant weld is of such good quality that the welded zones have been perfectly welded.

Next, comparative tests comparing this method with the conventional ones will be shown:

A circular hole of 8mm in diameter is made in the partition wall of about 1 mm in thickness that partitions the cell chambers of the battery container, and on both sides thereof are lead alloy-made plate-like lugs for cell-to-cell adhesion which are projected upwardly from and vertically on end portions of straps of mutually opposite polarities and positioned to face each other. Then, by a pair of electrodes having pressure projections at the central portion of their inner surfaces, that is, a pair of resistance welding guns, the pair of plate-like lugs of the straps of opposite polarities are pressed from their outer surfaces and made to be attached under pressure liquid-tightly to the circumferences of the hole of the partition wall, and in addition, the central portions of the mutually facing lugs are thrust into the hole for them to have pressure contact with each other. In this way, there were prepared a number of various batteries categories into seven kinds by the initial contact area between the pressure contact lugs, said contact area varied in the range from 7 mm to 1 mm as shown in the table below, and the resistance welding between the lugs for every one of each kind of these batteries was carried out by the conventional constant current control system, the constant voltage control system, the constant power control system without application of the up slope (U.S.) control and the constant power control system with application of the up slope (U.S.) control, respectively. The results obtained were as shown in the table below. The weld of each sample was cut apart and any one found to have even a single unwelded spot in the cut surface of the weld was labeled as a defective weldment while the one having no unwelded spot throughout the cut surface of the weld was labeled as a good weldment. Each percentage (%) value shown in the table below represents the rate for those labeled as a good one out of a predetermined number of the respective samples tested by each welding system.

| Diameter of contact zone mm | Constant current 5 KA | Constant voltage 0.4 V | Constant power 2 kw | U.S. 3 ∞ + Constant power 2 kw |
| --- | --- | --- | --- | --- |
| 1 | 10% | 10% | 50% | 100% |
| 2 | 50 | 50 | 90 | 100 |
| 3 | 90 | 90 | 100 | 100 |
| 4 | 100 | 100 | 100 | 100 |
| 5 | 100 | 100 | 100 | 100 |
| 6 | 90 | 90 | 100 | 100 |
| 7 | 50 | 50 | 90 | 100 |

As is clear from the above table, the constant power control system is effective especially in the case where the contact area between the members to be welded is comparatively small, as compared with the conventional constant current and constant voltage control systems. In this case, when the up slope control is applied in the initial stage of weld time, there can be obtained, regardless of differences in the size of the contact area, 100% of batteries having perfect welds with which the lugs have been welded together. In the foregoing embodying example of the present invention, there has been explained the case where the members e,e to be welded are polar lugs of straps, but it may be applied to welding of other lead alloy member bent plates used to construct a lead acid battery; for instance, the straps and a terminal electrode plate, etc. Thus, according to the present invention, members to be welded are welded by the constant power control system and, as a result, regardless of changes in the size of the contact area between the members to be welded, the secure welding thereof with a consistently constant heat value can be carried out. In this case, when a resistance value between the members to be welded is measured at intervals of a predetermined cycle and, based on the measured value, a current to be applied subsequently is controlled through the constant power controller for carrying out the welding thereof, the degree of perfectness in stable and good welding is increased. Further, when, in the initial stage of the current application, the applying current of a comparatively small current amount is gradually increased over a few cycles by the up slope control, a perfect welding can be carried out without sparking, all these being the advantages brought about by the present invention.

INDUSTRIAL APPLICABILITY

Thus, the present invention can be applied very effectively to the manufacturing of a lead acid battery.

I claim:

1. A resistance welding device comprising:
   a pair of resistance welding guns (4), (4) for pressing together two mutually facing surfaces of two members (e), (e) to be welded together and for applying an electric current to the members pressed together;
   a resistance measuring device (11) for measuring an electric resistance value between the two members (e), (e) to be welded together while they are in pressure contact;
   a constant power controller (13); and
   means for providing a signal indicative of the measured resistance value to the constant power controller so that a controlled current set by the constant power controller (13) is applied through the resistance welding guns (4), (4) to both of the two members (e), (e) to be welded.

2. A resistance welding device as claimed in claim 1 and further comprising:
   an up slope controller (15) for applying a current to both of the two members (e), (e) to be welded together in such a manner than the amount of electric current applied to the two members is increased gradually over a few cycles of current application beginning with the start of the application of current for welding the two members together.

3. A method for resistance welding members comprising parts of a lead acid storage battery to each other, comprising the steps of:
placing two facing surfaces of two members comprising part of a lead acid storage battery in pressurized contact;
applying an electric current from a power control system to flow through said two members; and
maintaining the power of said power control system constant as said facing surfaces of said members are welded to each other.

4. The method for resistance welding as defined by claim 3, wherein said power control system provides said electric current at intervals of a predetermined cycle and further including the steps of:
measuring an electric resistance value between both of said members as said electric current is applied in one cycle;
providing a signal indicative of the measured resistance value to the power control system; and
applying an electric current of a magnitude set in the power control system to both of said members in a subsequent cycle so as to maintain a constant power supplying said current in said power control system.

5. The method for resistance welding as defined by claim 3, wherein said power control system provides said electric current at intervals of a predetermined cycle and including the steps of:
gradually increasing the magnitude of electric current applied to both of said members over a few cycles prior to maintaining the power of said power control system constant.

* * * * *